United States Patent
Svenkeson et al.

(10) Patent No.: US 8,861,193 B1
(45) Date of Patent: Oct. 14, 2014

(54) HARD DRIVE CARRIER WITH VIBRATION ISOLATION

(75) Inventors: John William Svenkeson, Bloomington, MN (US); Gregory Jay Samson, St. Michael, MN (US); Richard Roy Fleming, Maple Grove, MN (US)

(73) Assignee: EMC Corporation, Hopkinton, MA (US)

( * ) Notice: Subject to any disclaimer, the term of this patent is extended or adjusted under 35 U.S.C. 154(b) by 278 days.

(21) Appl. No.: 13/421,759

(22) Filed: Mar. 15, 2012

(51) Int. Cl.
*G06F 1/16* (2006.01)
*G06F 1/18* (2006.01)
*G11B 33/08* (2006.01)

(52) U.S. Cl.
CPC .............. *G06F 1/187* (2013.01); *G11B 33/08* (2013.01)
USPC ..................................................... 361/679.36

(58) Field of Classification Search
CPC ............................................................ G11B 33/08
USPC ....................................................... 361/679.36
See application file for complete search history.

(56) References Cited

U.S. PATENT DOCUMENTS

| 5,216,582 | A  | * | 6/1993 | Russell et al. | 361/679.34 |
| 6,199,839 | B1 | * | 3/2001 | Rienzo | 361/679.34 |
| 6,299,266 | B1 | * | 10/2001 | Justice et al. | 361/679.36 |
| 6,304,457 | B1 | * | 10/2001 | Liu et al. | 361/679.36 |
| 6,498,722 | B1 | * | 12/2002 | Stolz et al. | 361/679.36 |
| 6,560,098 | B1 | * | 5/2003 | Beinor et al. | 361/679.39 |
| 7,019,966 | B2 | * | 3/2006 | Lee | 361/679.36 |
| 7,106,583 | B2 | * | 9/2006 | Koh et al. | 361/679.36 |
| 7,548,417 | B2 | * | 6/2009 | Lai | 361/679.36 |
| 7,616,436 | B2 | * | 11/2009 | DeMoss et al. | 361/679.36 |
| 7,656,656 | B2 | * | 2/2010 | Connelly et al. | 361/679.36 |
| 7,817,413 | B2 | * | 10/2010 | Peng et al. | 361/679.36 |
| 8,159,817 | B2 | * | 4/2012 | Lin et al. | 361/679.39 |
| 8,179,671 | B2 | * | 5/2012 | Kaneko et al. | 361/679.36 |
| 8,179,673 | B2 | * | 5/2012 | Reid et al. | 361/679.47 |
| 8,218,310 | B2 | * | 7/2012 | Ou | 361/679.36 |
| 8,619,421 | B2 | * | 12/2013 | Reid et al. | 361/679.47 |
| 2002/0051338 | A1 | * | 5/2002 | Jiang et al. | 361/685 |
| 2004/0150948 | A1 | * | 8/2004 | Tang | 361/685 |
| 2005/0088778 | A1 | * | 4/2005 | Chen et al. | 360/97.02 |
| 2005/0135000 | A1 | * | 6/2005 | Kao et al. | 360/97.01 |
| 2005/0237709 | A1 | * | 10/2005 | Huang | 361/685 |

\* cited by examiner

*Primary Examiner* — Lisa Lea Edmonds
(74) *Attorney, Agent, or Firm* — Sean M. Evans; Krishnendu Gupta

(57) ABSTRACT

A hard drive carrier includes a substrate and an elastomer pad. The substrate includes a pin and an opening. The opening has a perimeter, and the pin is dimensioned to fit inside of a mounting hole of a hard drive. The elastomer pad is molded over or around the pin, or may be place anywhere convenient for dampening vibration in the direction of the pin axis. The elastomer pad spans the opening. The elastomer is attached to the perimeter of the opening, and the elastomer pad has a protruding feature within the perimeter of the opening.

15 Claims, 9 Drawing Sheets

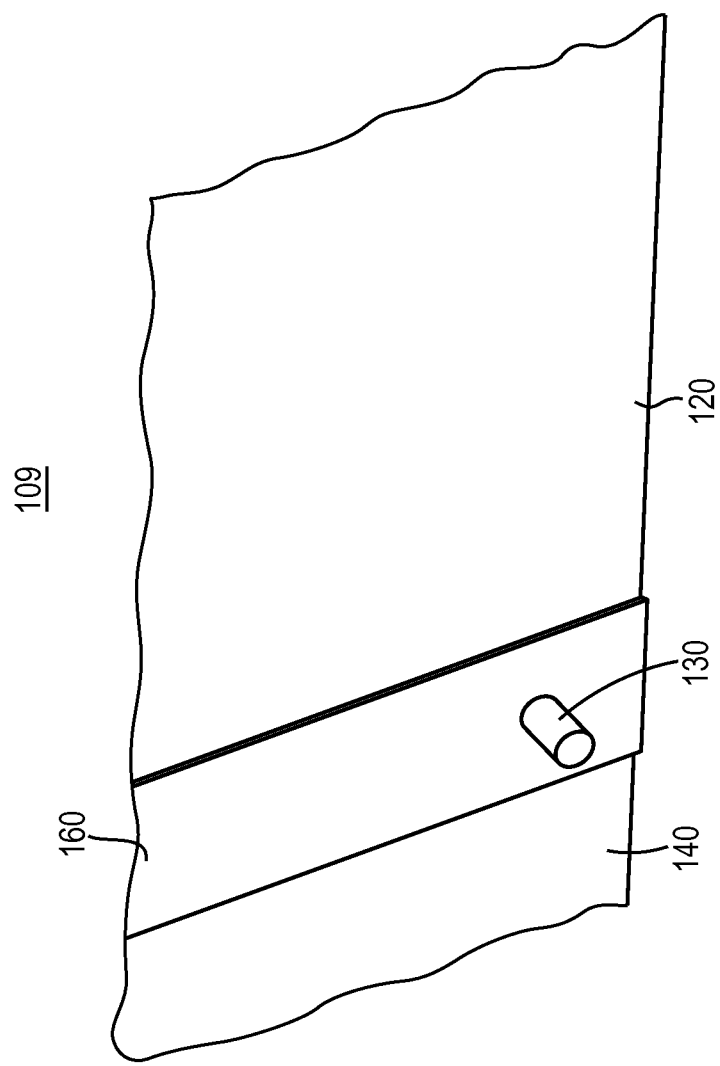

HARD DRIVE CARRIER WITH VIBRATION ISOLATION

TECHNICAL FIELD

The invention is related to hard drive carriers, and in particular, but not exclusively, to a hard drive carrier having pins in a substrate of the hard drive carrier to be inserted in mounting holes of the hard drive, where at least a portion of each of the pins are surrounded by an over-molded elastomer pad, and where the elastomer pad spans an opening in the substrate to act as a diaphragm-like window.

BACKGROUND

The framework of hard drive storage devices, as typically designed and supplied by vendors to meet a standard size and form that is defined by specifications that are developed, mutually accepted, and maintained by the suppliers and users of these devices has a defined maximum outside envelope, electrical connector type and location, and frame mounting hole size, location, and thread type that is defined for the end user to attach the hard drive into a larger computer or data storage system.

For ease of installation into and removal from data storage systems hard drive storage devices are typically assembled into a carrier that is specifically designed to conform the various hard drives from a variety of vendors to fit into the particular chassis of that computer or storage system. These hard drives are typically fastened to the carriers through the use of screws threaded, into the mounting holes located in the hard drive frame that are defined and provided by the standards just for this purpose. Typically then, the state of the art hard drive carrier provides a guidance system for accurately inserting the hard drive into a chassis, mating the hard drive with a mating electrical connection, and latching and holding the hard drive and carrier in place in the system.

BRIEF DESCRIPTION OF THE DRAWINGS

Non-limiting and non-exhaustive embodiments of the present invention are described with reference to the following drawings, in which:

FIG. 1A illustrates an embodiment of a portion of a hard drive carrier;

DETAILED DESCRIPTION

Figure 1B:
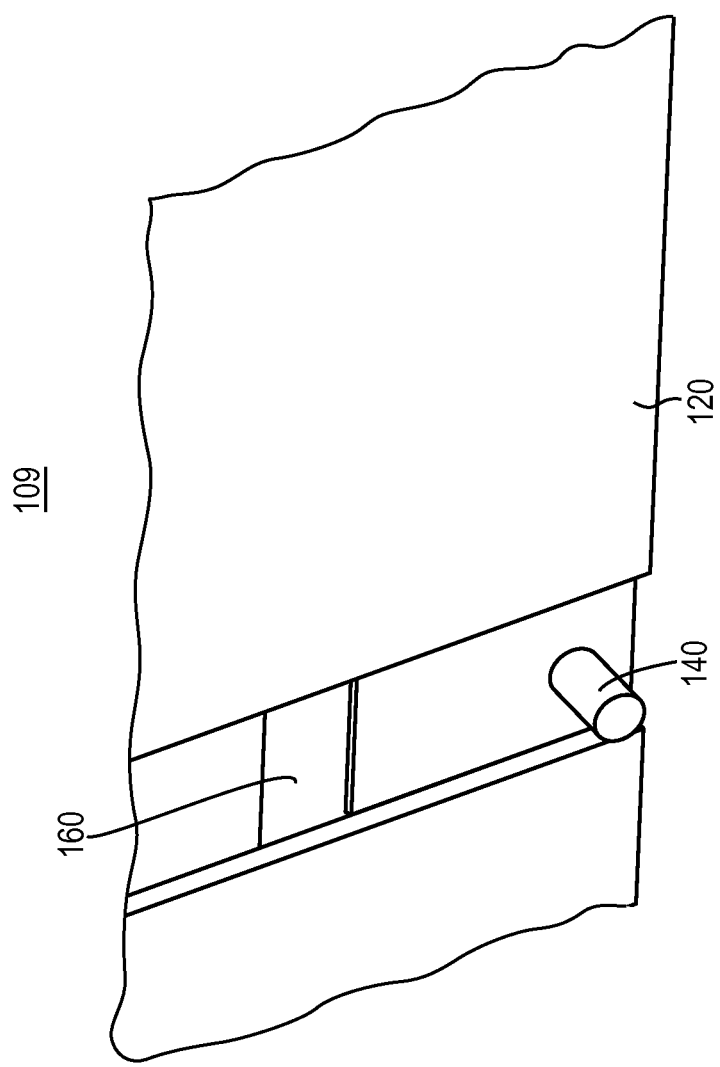
FIG. 1B is a view of the embodiment of the portion of the hard drive carrier of FIG. 1A without the elastomer so that the opening is visible.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "signal" means at least one current, voltage, charge, temperature, data, or other signal.

Briefly stated, the invention is related to a hard drive carrier that includes a substrate and an elastomer pad. The substrate includes a pin and an opening. The opening has a perimeter, and the pin is dimensioned to fit inside of a mounting hole of a hard drive. The elastomer pad is molded over or around the pin, or may be place anywhere convenient for dampening vibration in the direction of the pin axis. The elastomer pad spans the opening. The elastomer is attached to the perimeter of the opening, and the elastomer pad has a protruding feature within the perimeter of the opening.

FIGS. 1A and 1B illustrate a diagram of an embodiment of a portion (109) of a hard drive carrier. FIG. 1B shows portion 109 without the elastomer so that opening 150 is visible. Portion 109 includes substrate 120 and elastomer pad 130. Substrate 120 includes pin 140 and opening 150. Elastomer pad 130 is molded in the area around the pin and spans the opening, or may be anyplace that is convenient for dampening vibration in the direction of the axis of pin 140. Also, elastomer pad 130 is attached to the perimeter of opening 150. In some embodiments, elastomer pad 130 is attached with the perimeter of opening 150 by being chemically bonded to the perimeter of opening 150. Also, elastomer pad has 130 a protruding feature 160 within the perimeter of the opening 150 (but on the opposite side of elastomer pad 130 as opening 150). Pin 140 is dimensioned to fit inside of a mounting hole of a hard drive.

Portion 109 shows a simple example of a portion (109) of a hard drive carrier, which, in various embodiments, may include several pins, several pads, several openings, and several protruding features rather than the simple example of one pin, one pad, one opening, and one protruding feature that are specifically illustrated in FIG. 1.

Molded pin 140 is dimensioned to insert loosely into a hard drive mounting hole, to hold the hard drive in place while allowing freedom of movement (in the direction of the axis of pin 140) for the hard drive to compress and flex the elastomer as the hard drive vibrates. The elastomer may be molded over pin 140 to dampen the vibration transmission path between the hard drive and substrate 120 or the pin itself may be bare substrate with the areas at the pin base surrounded by overmolded elastomer that supports the drive in such a manner that the pin fits so loosely in the holes of the drive frame that the pin, because of its loose fit, does not transmit significant amounts of vibration to and from the carrier.

Where elastomer pad 130 spans opening 150, elastomer pad 130 forms a diaphragm whose vibration dampening qualities can be adjusted by adjusting the size and shape of the opening that is spanned, and the size, shape, and durometer of the elastomer in that area. Protruding feature 160 makes contact with the body of the hard drive. In combination with the diaphragm effect of the elastomer 130 inside opening 150 that is chemically (or mechanically) bonded to the perimeter of opening 150, the elastomer at the opening 150, in contact with the hard drive via protruding feature 160, has the freedom to move in and out of the window, giving the elastomer more freedom of movement. This provides further vibration isolation between the hard drive and substrate 120.

FIGS. 1A and 1B show only a portion (109) of a hard drive carrier. The entire hard drive carrier is shaped and dimensioned to enclose a hard drive, and to hold the hard drive in place by means of one or more molded pins 140 inserted loosely into corresponding hard drive mounting holes in the hard drive. One or more protruding feature(s) 160 also contact the hard drive. Only the elastomer 130 contacts the hard drive; substrate 120 does not directly contact the hard drive. And in some embodiments, the elastomer 130 has only a very small amount of contact with the hard drive—only at the around the molded pins 140 and at the protruding features 160. Particular embodiments of the hard drive carrier below show specific embodiments of hard drive carrier illustrating examples of how the hard drive carrier may enclose the hard drive in particular embodiments. For example, an embodiment of a fastenerless hard driver carrier that snaps in place around the hard drive is shown in greater detail below in accordance with one embodiment of the invention. However, the invention is not so limited, and other hard drive carrier configurations, including configurations that are not fastenerless, are also within the scope and spirit of the invention.

Figure 2:
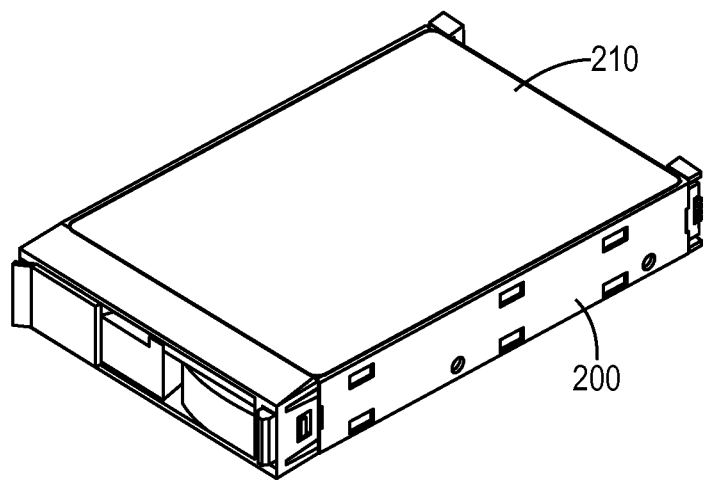
FIG. 2 shows an embodiment of the hard drive and hard drive carrier that includes an embodiment of the portion of FIG. 1A.

FIG. 2 shows an embodiment of hard drive 210 and hard drive carrier 200. Hard drive carrier 200 includes an embodiment of portion 109 of FIG. 1. Hard drive carrier 200 holds hard drive 210 by means of integral molded pins that align into the standard mounting holes of hard drive 200. Protruding features in hard drive carrier 200 contact hard drive 210. FIG. 2 shows hard drive 210 and hard driver carrier 200 after assembly, and accordingly not all of these features are visible in FIG. 2, but may be seen in FIG. 3 which shows an embodiment of the hard drive and carrier prior to assembly.

Figure 3:
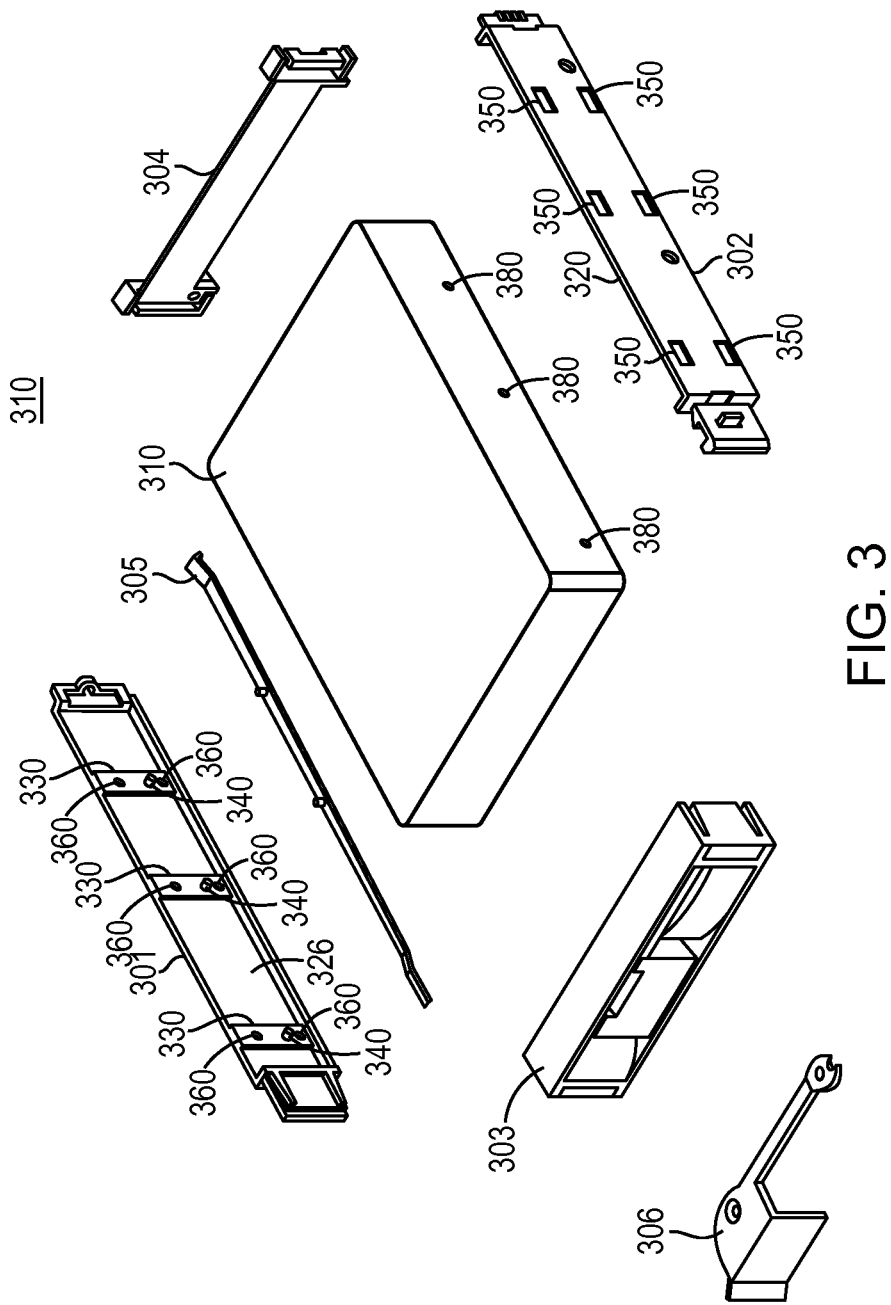
FIG. 3 illustrates an embodiment of the hard drive and hard drive carrier of FIG. 2 prior to assembly.

FIG. 3 illustrates an embodiment of hard drive 310 and hard drive carrier 300, which may be employed as embodiment of hard drive 210 and hard drive carrier 200 of FIG. 2 prior to assembly of hard drive carrier 200.

Hard drive carrier 300 includes left side member 301, right side member 302, front bezel 303, rear clip 304, light pipe 305, and injector/ejector latch lever 306. Left side member 301 and right side member 302 each include substrate 320 and elastomer pads 330. Substrate 320 of each side member includes pins 340 and openings 350. Elastomer pads 330 each include protruding features 360 centered within each opening 350 (on the opposite side of the opening). Hard drive 310 includes mounting holes 380.

Figure 4:
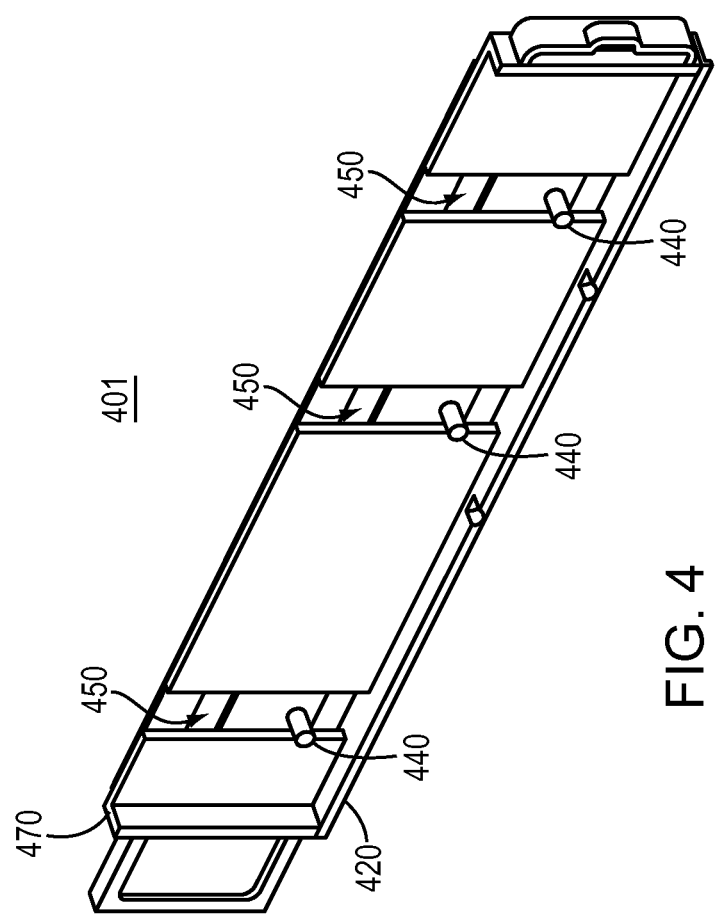
FIG. 4 illustrates an embodiment of a side member of an embodiment of the hard drive carrier of FIG. 3 prior to elastomer molding.

FIG. 4 illustrates an embodiment of side member 401, which may be an embodiment of left side member 301 of FIG. 3 and/or right side member 302 of FIG. 3, prior to elastomer molding. Side member 401 includes substrate 420, which includes recessed areas 470, openings 450, and pins 440. In one embodiment, as shown in FIG. 4, each recessed area include one pin 440 and two openings 450. Other configurations may be used in other embodiments.

Recessed areas 470 are areas to be filled with elastomer. Openings 450 are windows in substrate 420 that are to be spanned by the elastomer. Pins 440 are dimensioned to be inserted loosely into the hard drive mounting holes after molding.

Figure 5:
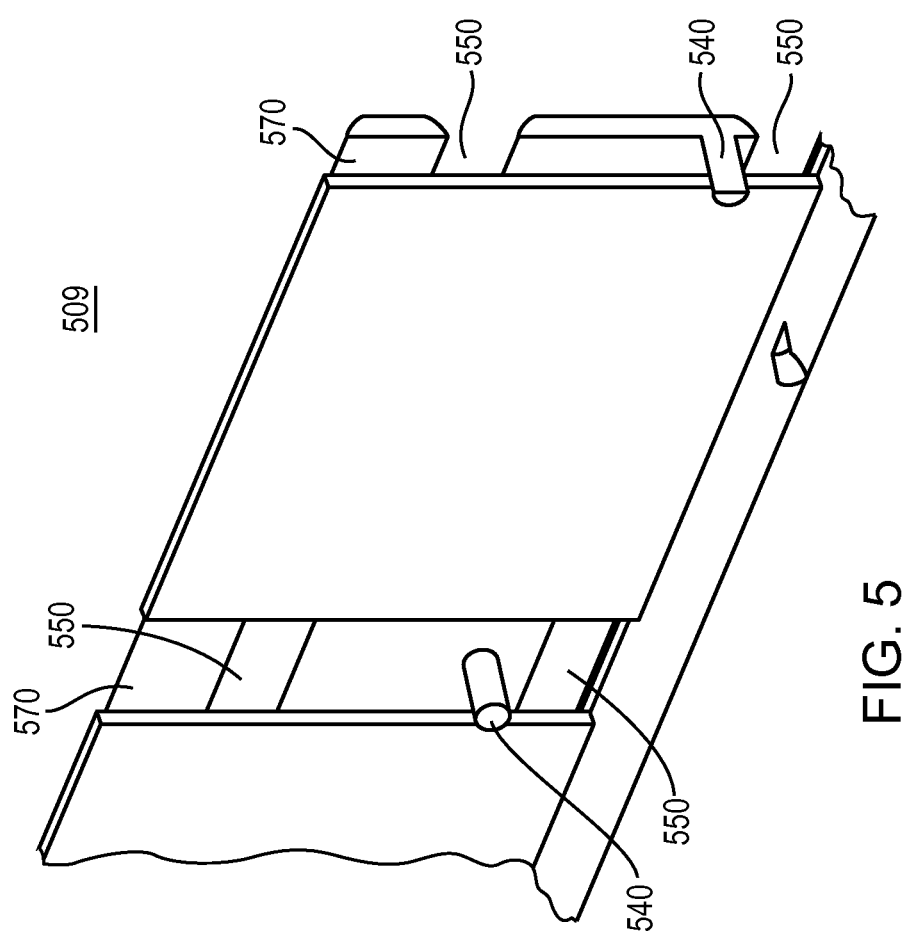
FIG. 5 shows a close up cross section of an embodiment of the side member of FIG. 4 prior to elastomer molding.

FIG. 5 shows a close up cross section of an embodiment of, portion 509 of a side member, which may be employed as an embodiment of a portion of side member 401 of FIG. 4 prior to elastomer molding. An embodiment of recessed area 570, pin 540, and two openings 550 are shown in greater detail in FIG. 5, as well as another portion of such a recessed area 570. In some embodiments, the elastomer is molded onto substrate 520 with injection molding, i.e., over-molding.

Figure 6A:
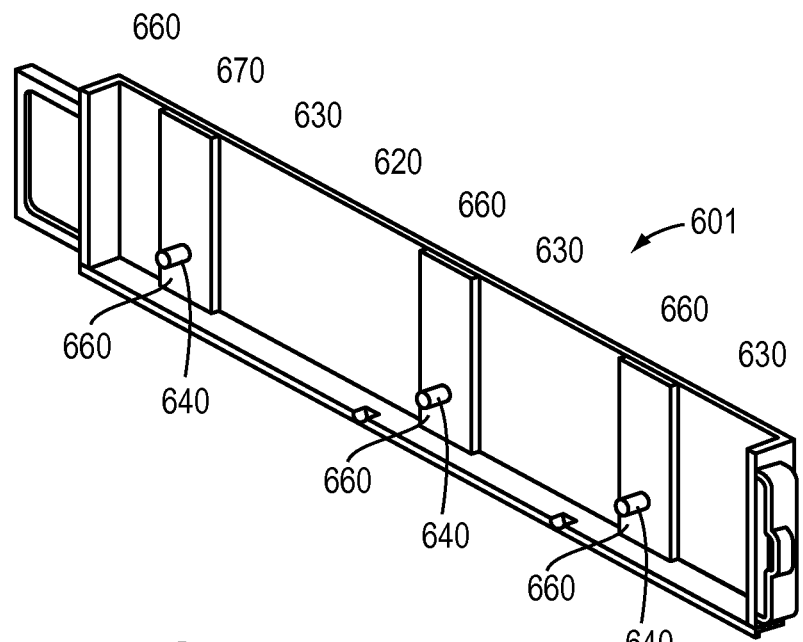
FIG. 6A illustrates an embodiment of the side member of FIG. 4 after elastomer molding.
Figure 6B:
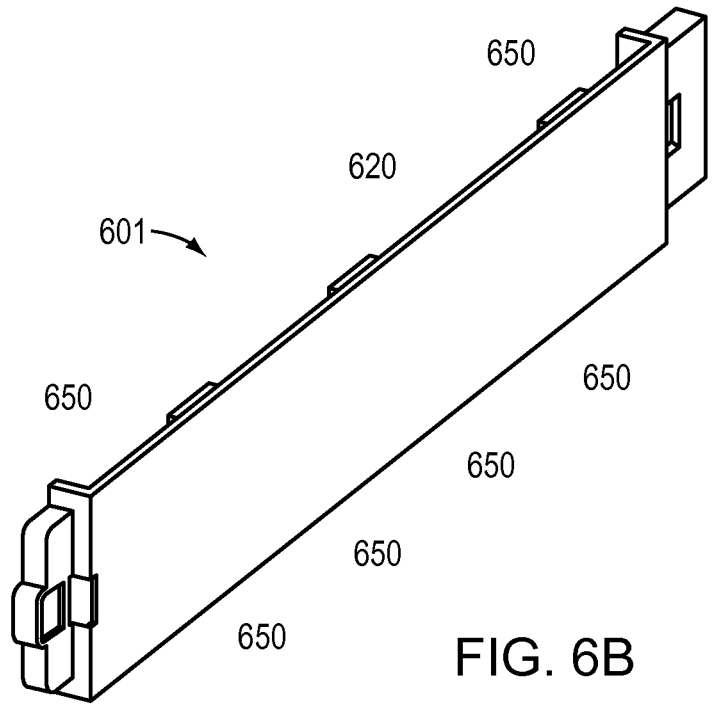
FIG. 6B is the reverse view of the embodiment of the side member of FIG. 6A.

FIGS. 6A and 6B illustrate an embodiment of side member 601, which may be employed as an embodiment of side member 401 of FIG. 4 after elastomer molding. FIG. 6B is the reverse view of the view of side member 601 illustrated in FIG. 6A. Side member 601 includes substrate 620 and elastomer pads 630. Substrate 620 includes recessed areas 670, openings 650, and pins 640. In one embodiment, as shown in FIG. 4, each recessed area includes one pin 640 and two openings 650. Other configurations may be used in other embodiments. Elastomer pads 630 are molded into each recessed area 670. Each pin 640 is molded by an elastomer pad 630. Protruding features 660 protrude from elastomer pad 640 within and opposite each window. In some embodiments, each protruding feature 660 is centered within its corresponding window. Each elastomer pad 630 is chemically (or mechanically) bonded to the perimeter of each opening 650. The elastomer is slightly recessed at each opening 650 on the side of the opening 650 to allow flex movement of the elastomer orthogonal to the plane of opening 650.

Figure 7:
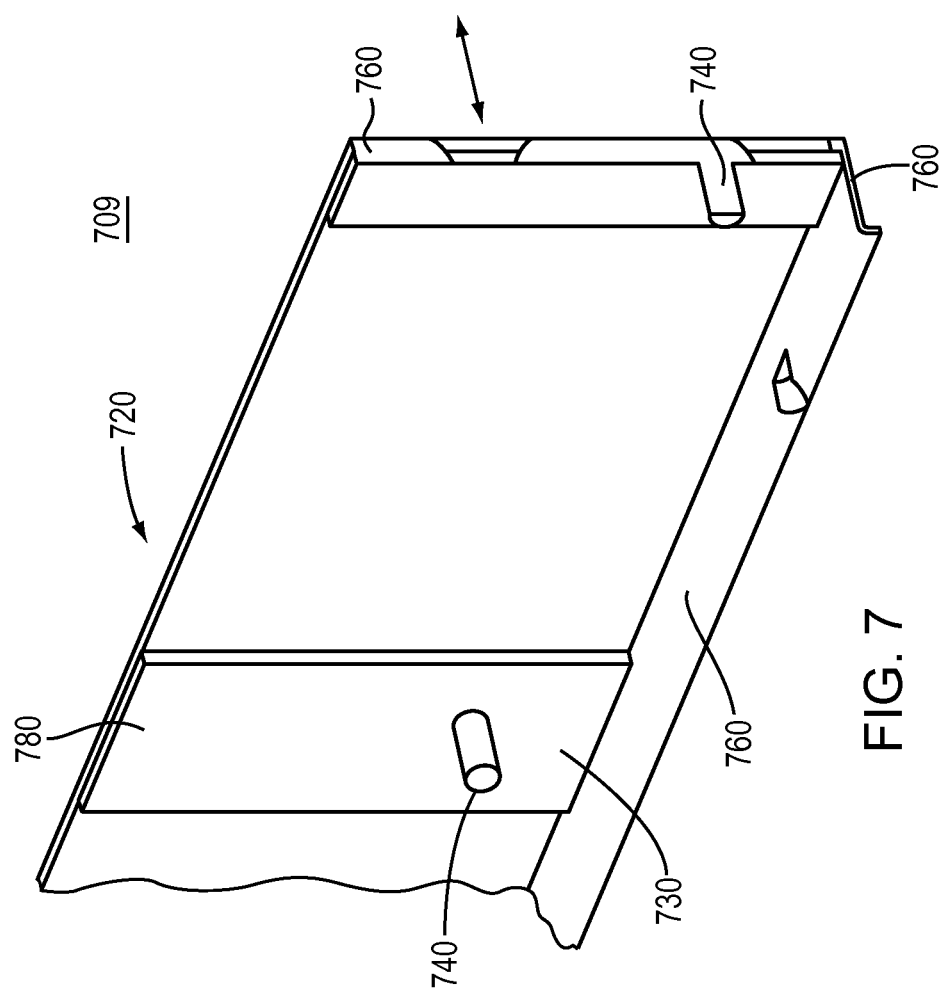
FIG. 7 shows a close up cross section of an embodiment of the side member of FIG. 5 after elastomer molding.

FIG. 7 shows a close up cross section of an embodiment of a portion 709 of an embodiment of side member 601 of FIG. 6 after elastomer molding. An embodiment of pin 740, elastomer pad 730, and protruding features 760 are shown in greater detail in FIG. 7, as well as an embodiment of a portion of another elastomer pad 730 and pin 740. In some embodiments, substrate 720 is composed of a rigid plastic such as hard acrylonitrile butadiene styrene (ABS) plastic, and elastomer pads 730 are composed of a soft elastomer such as Shore A 50 durometer chemically bonded thermoplastic. Other suitable materials may be employed in other embodiments.

Figure 8:
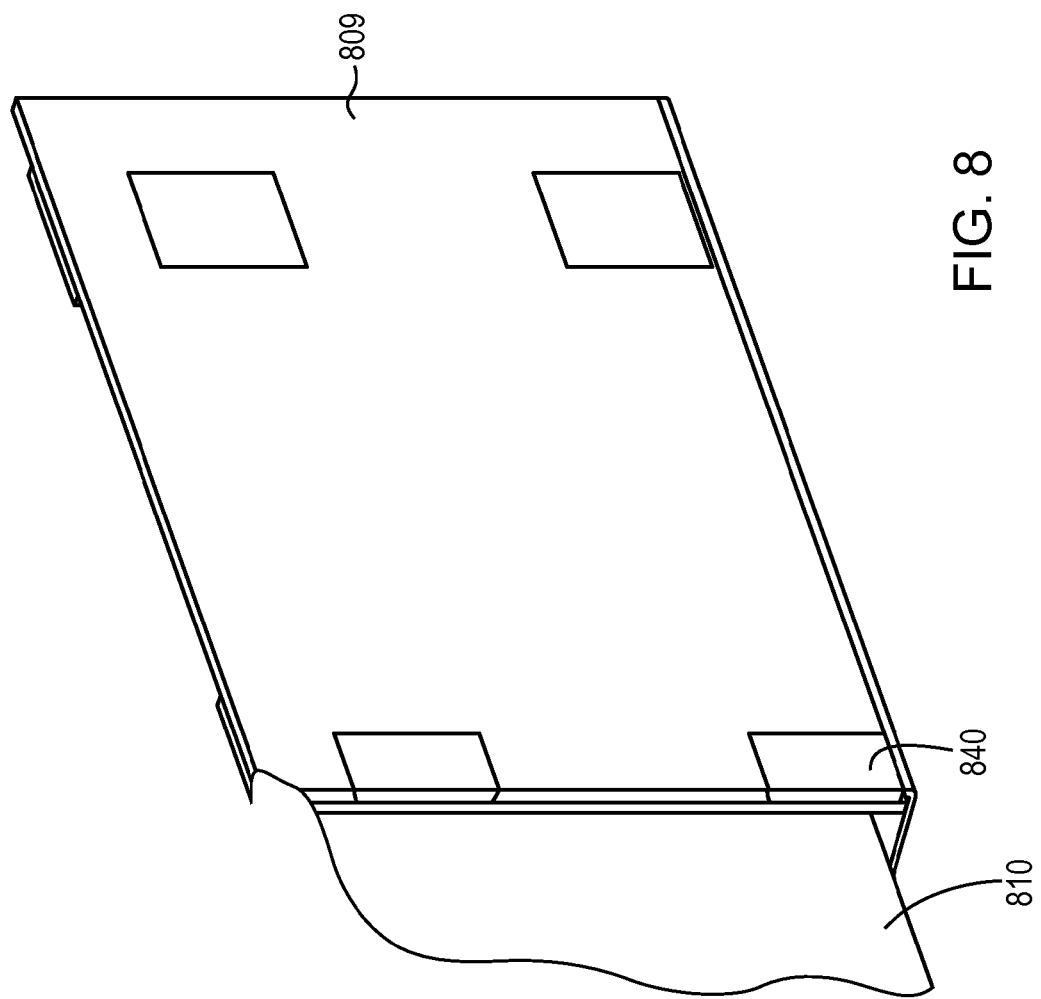
FIG. 8 shows a close up cross section of an embodiment of the side member of FIG. 7 assembled onto to the hard drive, in accordance with aspects of the invention.

FIG. 8 shows a close up cross section of an embodiment of portion 809, which may be employed as an embodiment of portion 709 of a side member of FIG. 7 assembled onto hard drive 810. As shown, side member substrate pin 840 inserts loosely into hard drive mounting holes when assembled onto hard drive 810.

Returning now to FIG. 3, as shown, some embodiments of hard drive carrier 300 employs a fastenerless system to assemble carrier 300 around hard drive 310. Instead of screws, hard drive carrier 300 provides pins 340 that insert into the standard threaded mounting screw hole locations 380 during this assembly to hold hard drive 310 in place. Although the standard threaded mounting screw hole locations 380 in hard drive 310 are designed for attachment to a hard drive carrier, hard drive carrier 300 employs pins 340 molded by elastomer 330 instead of screws. Each of the pins 340 is of slightly smaller diameter than the thread. The elastomer contacts the surface of hard drive 310 around the hole 380. The elastomer that molds the pin contacts hard drive 310; the pin 340 itself does not contact hard drive 310. Accordingly, hard drive 310 has a degree of freedom of movement in the direction of the axis of the pins 340 that keep it in place in the adaptive hard drive carrier 300. As discussed above, an integrated elastomer is overmolded around and near the defined mounting locations 380. This elastomer dampens the vibration transmission path in those locations.

Further, as discussed above, the elastomer spans across openings in the carrier frame. The elastomer that spans the opening forms a diaphragm, whose vibration dampening qualities can be adjusted by adjusting the size and shape of the opening that is spanned, and by the size, shape, and durometer of the elastomer in that area. The elastomer at the opening contacts the hard drive 310 via a protruding feature 360. The use of the diagram openings 350 allow much more versatility in the dampening design than can be achieved with the elastomer alone due to the current limitations in available materials and durometers of materials that can be overmolded with today's state of the art overmolding practices. The injection molding allows the elastomer to be designed to a vast variety of shapes and hardness and to be tailored to achieve optimization in vibration dampening effect.

As discussed above, some embodiments employ injection of an overmolded elastomer such as Shore A 50 durometer chemically bonded thermoplastic. In some embodiments, rather than being chemically bonded, the elastomer is mechanically captured in place by the assembly function. The softness of the elastomer is a critical factor in amount of mechanical isolation provided between the hard drive 310 and the pins 340 by the elastomer between the hard drive 310 and the pins 340. It is possible to use softer elastomer by hand placement the elastomer into the assembly than by injection molding of the elastomer. Using the softest possible elastomer via injection molding may not provide sufficient vibration dampening in the path between the hard drive 310 and the pins 340, if the diaphragm windows were not present.

However, the extra vibration dampening provided by the diaphragm windows allows sufficient vibration dampening with Shore A 50 durometer chemically bonded thermoplastic, which may be molded with injection molding. Since injection molding may thereby be used while providing the desired vibration isolation, significant ease of assembly is provided and a more economical means of assembly is provided while achieving better vibration isolation. Reduction of material cost and amount of labor for assembly of the hard drive 310 into hard drive carrier 300 may achieved.

Hard drive performance is adversely affected by vibrations in the surrounding chassis caused by cooling fans, other hard drives, or any other source of physical energy. Hard drive carrier 300 prevents this reduction in performance of hard drive 300 by isolating hard drive 310 so that hard drive 310 is not affected by surrounding vibrations and conversely so that hard drive 310 does not impart vibration energy into the surrounding chassis that might affect other neighboring hard drives. Hard drive carrier 300 may be employed to achieve reduction of the amount of adverse vibration energy transmitted both into and out of hard drive carrier 300.

In some embodiments, each of the six pieces (301-306) of hard drive carrier 300 has, by design, spring loaded features that interlock and snap in place with the other pieces of the carrier to form this framework without the use of tools or fasteners. The framework snaps together capturing hard drive 310 inside this frame. Each of the six pieces (301-306) includes mating features in the side that snap together, so that to assemble the hard drive, the pins are placed in the mounting holes 380 of hard drive 310 and then the ends are snapped on to complete the assembly.

Hard drive 310 is held in place in adaptive hard drive carrier 300 as a result of integral molded pin shaped protrusions that align into the standard mounting holes 380 of the drive and are help in place by the act of interlocking and latching the completed carrier assembly. Hard drive 310 is isolated from vibrations that might be transmitted from the drive carrier 300 by the elastomer that is molded onto the drive carrier sides in the areas of the mounting pins 340. Snap fitting all of the parts together instead of using screws, rivet, press pins, or other fasteners saves assembly time and cost. The elastomer and the openings 350 which the elastomer spans can be customized in shape, features, and elasticity so as to optimize vibration dampening and drive performance at different levels of vibration and frequency of vibration.

Left side member 301, right side member 302, front bezel 303, and rear clip 304 provide the framework for the drive carrier 300, which are snapped into placed to capture hard drive 310 after pins 340 are placed in the threaded mounting holes 380 of hard drive 310. Light pipe 305 allows light to be brought from the back panel that hard drive 310 may plug into out to the front of the chassis, for use as an activity light and/or the like. Lever 306 may be employed to latch into the chassis, or to remove it.

Although FIG. 3 illustrates a particular embodiment of hard drive carrier 300, many variations are possible within the scope and spirit of the invention. Different numbers and placements of pins, openings, protruding features, elastomers pads, and/or the like may be used in various embodiments. Not all embodiments snap into place as illustrated in FIG. 3. Features such as light pipe 305 and lever 306 are optional features that are not included in all embodiments of hard drive carrier 300. In some embodiments, the pins may be completely surrounded and molded into part of the elastomer. These variations and others are within the scope and spirit of the invention.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. An apparatus, comprising:
    a hard drive carrier, including:
        a substrate that includes a pin and an opening, wherein the opening has a perimeter, and wherein the pin is dimensioned to fit inside of a mounting hole of a hard drive; and
        an elastomer pad that is molded over at least a portion of the substrate and that spans the opening, wherein the elastomer pad is attached to the perimeter of the opening, wherein the elastomer pad has a protruding feature within the perimeter of the opening, and wherein the protruding feature is dimensioned to physically contact the hard drive when the hard drive carrier encloses the hard drive.

2. The apparatus of claim 1, wherein
the elastomer is attached to the perimeter of the opening by being chemically bonded to the perimeter of the opening.

3. The apparatus of claim 1, wherein
the elastomer is attached to the perimeter of the opening by being mechanically attached to the perimeter of the opening.

4. The apparatus of claim 1, wherein the hard drive carrier is shaped for fastener-less assembly around the hard drive.

5. The apparatus of claim 1, wherein the protruding feature is in approximately the center of the opening.

6. The apparatus of claim 1, wherein the substrate further includes another opening, wherein said another opening has a perimeter, wherein the elastomer pad spans said another opening, wherein the elastomer pad is attached to the perimeter of said another opening, wherein the elastomer pad has another protruding feature, and wherein said another protruding feature is within the perimeter of said another opening.

7. The apparatus of claim 1, wherein the substrate is composed of plastic.

8. The apparatus of claim 1, wherein the elastomer pad is injection molded onto the substrate.

9. The apparatus of claim 1, wherein elastomer pad is composed of a chemically bonded thermoplastic.

10. The apparatus of claim 1, wherein the hard drive carrier includes a plurality of portions that include interlocking features that snap together during assembly of the hard drive carrier.

11. The apparatus of claim 1, wherein the pin has a diameter that is slightly less than a diameter of the mounting hole of the hard drive such that, when the hard drive carrier is assembled around the hard drive, the elastomer pad near the pin physically contacts the hard drive rather than the substrate directly contacting the hard drive.

12. The apparatus of claim 1, wherein the elastomer pad surrounds the base of the pin where the pin inserts into the mounting hole of the hard drive during assembly of the hard drive carrier.

13. The apparatus of claim 1, wherein the substrate further includes another pin, another opening, and another elastomer pad, wherein said another opening has a perimeter, wherein said another pin is dimensioned to fit inside another mounting hole of the hard driver, wherein said another elastomer pad is molded over at least a portion of said another pin, wherein said another elastomer pads spans said another opening, wherein said another elastomer pad is attached to the perimeter of said another opening, wherein said another elastomer pad has another protruding feature, and wherein said another protruding feature is within the perimeter of said another opening.

14. The apparatus of claim 1, wherein the substrate further includes a plurality of additional pins, a plurality of additional openings, and a plurality of additional elastomer pads, wherein each opening of the plurality of additional openings has a perimeter, wherein pin of the plurality of additional pins is dimensioned to fit inside a different corresponding mounting hole of the hard driver, wherein each elastomer pad of the plurality of additional elastomer pads is molded over at least a portion of a separate corresponding one of each pin of the plurality of additional pins, wherein each elastomer pad of the plurality of additional elastomer pads spans a separate corresponding opening of the plurality of additional openings, wherein each elastomer pad of the plurality of additional elastomer pads is attached to the perimeter of the corresponding opening of the plurality of additional openings, wherein each elastomer pad of the plurality of additional elastomer pads has a protruding feature, and wherein the protruding feature of each elastomer pad of the plurality of elastomer pads is within a separate corresponding perimeter of a corresponding opening of the plurality of additional openings.

15. The apparatus of claim 14, wherein, when the hard drive carrier is assembled around the hard drive, the hard drive contacts the hard drive carrier only at: the protruding features of each of the elastomer pads, and the portion of each of the elastomer pads that is around each of the pins.

* * * * *